Nov. 6, 1951     P. D. BARTON     2,574,139
DEPRESSURING SYSTEM
Filed June 15, 1949
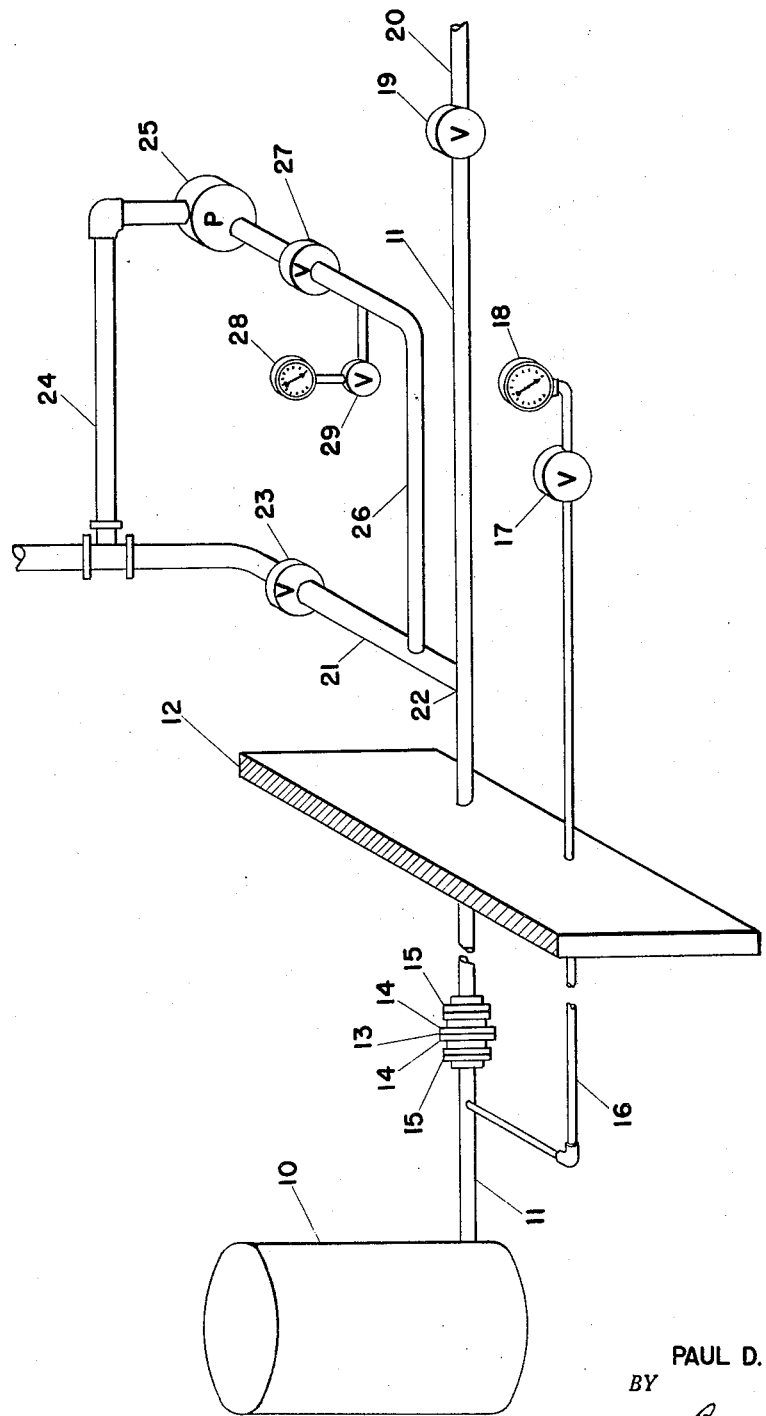
INVENTOR.
PAUL D. BARTON
BY
*Busser and Harding*
ATTORNEYS Patented Nov. 6, 1951

2,574,139

UNITED STATES PATENT OFFICE 2,574,139

DEPRESSURING SYSTEM

Paul D. Barton, Phoenixville, Pa., assignor to Sun Oil Company, Philadelphia, Pa., a corporation of New Jersey Application June 15, 1949, Serial No. 99,237

7 Claims. (Cl. 220—89)

This invention relates to depressuring systems and particularly to relief systems for pressure vessels used in the manufacture of volatile products.

Refineries and chemical manufacturing plants which produce and operate with highly volatile liquids require pressure relief devices positive and safe in operation. This requirement is met, normally, by equipping pressure vessels with standard relief valves installed in strict compliance with established codes. Some vessels, particularly those used in high pressure fractionation of highly volatile hydrocarbons, may become so weakened during a fire, for example, so that rupture at pressures below the relief valve design becomes a great hazard. It is, therefore, the primary object of this invention to provide an emergency relief system which is controlled externally of the manufacturing apparatus. A further object is to provide for controlled manual operation from a remote and safe place by the operator of the equipment.

The drawing discloses a preferred embodiment of the equipment arrangement by which these objects, and others evident from the following detailed description, may be accomplished. The elements of the system are illustrated diagrammatically and in perspective showing a pressure vessel 10 in which a volatile liquid is being processed. A relief conduit 11, all other piping and connections being omitted for clarity, is shown extending an indefinite distance from the pressure vessel through a wall or shield 12. Although represented here in symbol form, this wall or shield 12 may be the wall of a building in which the remainder of the operating equipment of the system is enclosed, or may be a protective shield erected a safe operating distance from the pressure vessel 10. In the relief conduit 11 a frangible diaphragm 13 is mounted between supporting flanges 14 which, in turn, is flanged to the conduit at points 15 for quick and complete dismantling after rupture as will be explained in the operation.

Connected to the conduit 11 between the frangible diaphragm 13 and the pressure vessel 10, a pressure line 16 is carried through the shield 12 and includes a valve 17 and pressure gauge 18 as a ready reference for the operator. The conduit 11 also passes through the wall and is valved on the end by valve 19. The conduit 20, leading from valve 19, leads to a header which may connect many of these relief systems to a common disposal area.

Behind the shield 12 and in operating position, the conduit 21 enters the conduit 11, as at point 22, and is connected to a supply of liquid (not shown) maintained at predetermined pressure either from a closed pipe line or from a stand pipe. The valve 23 is inserted between the source of liquid and conduit 11 to enable the operator to divert the liquid through conduit 24, pump 25 and conduit 26 when a rupturing pressure is required. The pump 25 may be actuated by steam or electricity or other power, but is preferably a hand operated device similar to pumps used for hydraulic pressure testing. Thus, the pressure would be assured should all sources of power fail. A valve 27 and pressure gauge 28 in conduit 26 complete the system. The valve 29 is inserted to permit removal of the pressure gauge for periodic check and adjustment.

The system is placed in operation by closing valve 27 and opening valve 23 to permit the liquid in conduit 21 to fill conduit 11 and press against the diaphragm 13 in opposition to the pressure exerted from the vessel 10. The valve 19 is closed at this time and the pressure liquid fills the system. A stand pipe as a source of supply for the liquid connected to conduit 21, is preferred as the hydraulic head is static and may freely act as a cushion for variations in pressure from vessel 10 which cause the diaphragm to fluctuate. The pressures on each side of the diaphragm being in opposition, the rupture stress of the diaphragm is not reached without an additional force.

The operator is aware of the pressure existing in the vessel 10 by reading the pressure gauge 18, which is operating through open valve 17 and conduit 16, tapped into conduit 11 between the diaphragm 13 and the pressure vessel 10. When a dangerous pressure is reached, pump 25 is started or operated by hand in the preferred embodiment, valve 27 opened and valve 23 closed, thereby directing the pressure liquid through the pump. The liquid used for this pressure purpose is non-volatile and non-freezing and may be a lube oil of low viscosity. The pump 25 builds up pressure, which is indicated on gauge 28, until the frangible diaphragm 13 is ruptured when the gauge indicator dips violently. The operator then opens valve 19 and permits the pressure to exhaust through conduit 20 to a disposal point not shown. Valve 27 is closed and the pump 25 stopped, retaining the maximum amount of pressuring liquid in the stand pipe which may be a common source for many such systems as noted above. Valve 23, having been closed when the liquid was by-passed through the pump, remains closed and conserves the supply. The flange supports for the diaphragm are readily removed and a new diaphragm placed, making the system ready for renewed operation.

A system for controlling the pressure in many types of vessels and pipe lines where the contents are gaseous in nature, which is simple in its elements and both safe and positive in operation, is detailed above. An example of one application of this device would be the well known high pressure fractionating tower in the refining of petroleum. Such towers are protected by safety relief valves which are spring loaded and set with regard to the maximum design working pressure of the tower based on code safety factors calculated on strength of materials compatible with normal conditions. In case of a serious fire with flame impingement on the vessel shell, the strength of the metal may be so reduced as to more than cancel the design safety factor resulting in the possibility of a rupture occurring at the pressure being maintained by vaporization of the liquid contents, and the throttling of the vapor release by the safety valve, the latter automatically closing and opening at or near the set relief pressure. The disclosed system containing an hydraulic pressure medium such as the liquid described, would release the mounting vapor pressures while the vessel was still unruptured and add no appreciable increase in pressure by the liquid entering the vessel through the ruptured diaphragm. The controlled release of the pressure by venting through the blow-down lines to a disposal conduit protects the equipment and the lives of the workmen working in and around the plant.

I claim:

1. A depressuring system comprising in combination with a pressure source, a relief conduit extending from said source, a frangible diaphragm in said conduit, a liquid supply connected to said conduit adapted to oppose the pressure of said source and at a pressure below the rupturing stress of the diaphragm, means cooperating with said relief conduit to increase the pressure of said liquid to break the diaphragm, and valve means in said conduit to relieve the pressure source after the diaphragm is ruptured.

2. A depressuring system comprising in combination a pressure vessel, a pressure relief conduit extending from said vessel, a frangible diaphragm in said conduit, a liquid supply connected to said conduit on the down-pressure side of the diaphragm, means to increase the pressure of said liquid beyond the breaking stress of said diaphragm and an escape valve in said conduit permitting pressure relief after the rupture of the diaphragm.

3. In a depressuring system, the combination of a pressure source, a pressure relief conduit extending from said source, a frangible diaphragm in said conduit, a stand pipe connected to said conduit on the down pressure side of the diaphragm, a liquid supply in said stand pipe and pressure relief conduit adapted to substantially counterbalance the pressure from the pressure source on said diaphragm, means to increase the pressure of said liquid to rupture the diaphragm, and an escape valve in said conduit to divert the released pressure.

4. A depressuring system comprising in combination a pressure vessel, a conduit extending therefrom and operative to transmit pressure therethrough; a frangible diaphragm external of said vessel in the conduit; a liquid supply connected to said conduit on the side of the diaphragm opposite to the pressure, and in which the pressure of said liquid is maintainable substantially at that of the vessel pressure but below the breaking stress of the diaphragm; a pump connecting said liquid supply and adapted to increase the fluid pressure to rupture said diaphragm; a header valve in said conduit on the fluid side of the diaphragm; and a drain from said header valve to disperse the vessel pressure after the diaphragm is ruptured.

5. In a depressuring system, the combination with a pressure vessel, a conduit extending therefrom and operative to transmit pressure therethrough, a second conduit communicating with the first conduit and adapted to contain liquid under pressure, and a frangible diaphragm in the first conduit between the pressure vessel and the second conduit; a by-pass connected with the second conduit, a pump in the by-pass operative to force liquid flowing through said by-pass under a pressure adequate to effect rupture of the diaphragm, and an escape valve in the first conduit to divert the pressure released from the pressure vessel.

6. The combination defined in claim 5 comprising a valve in the second conduit which may be normally open to allow transmission of liquid pressure to the diaphragm and which is closable during the operation of the pump, and a valve in the by-pass which is openable to allow the pump to operate as specified.

7. A depressuring system comprising in combination a pressure vessel, a main conduit connected with the pressure vessel and a shield through which said conduit extends, a frangible diaphragm in said conduit between the pressure vessel and the shield, a second conduit in open communication with the first conduit, in which a pressure is maintainable substantially at that of the pressure vessel but below the breaking stress of the diaphragm, a valve in the second conduit, a by-pass connected at one end with the second conduit at a point thereon more distant from the main conduit than said valve and at its other end in open communication with the main conduit, a pump and a valve in the by-pass and an escape valve in the first mentioned conduit beyond the connection therewith of the second conduit.

PAUL D. BARTON.

REFERENCES CITED

The following references are of record in the file of this patent:

UNITED STATES PATENTS

| Number | Name | Date |
|---|---|---|
| 1,172,884 | Gungerich | Feb. 22, 1916 |
| 2,317,836 | Weaver | Apr. 27, 1943 |
| 2,480,967 | Ritchie | Sept. 6, 1949 |